United States Patent Office 3,483,438
Patented Dec. 9, 1969

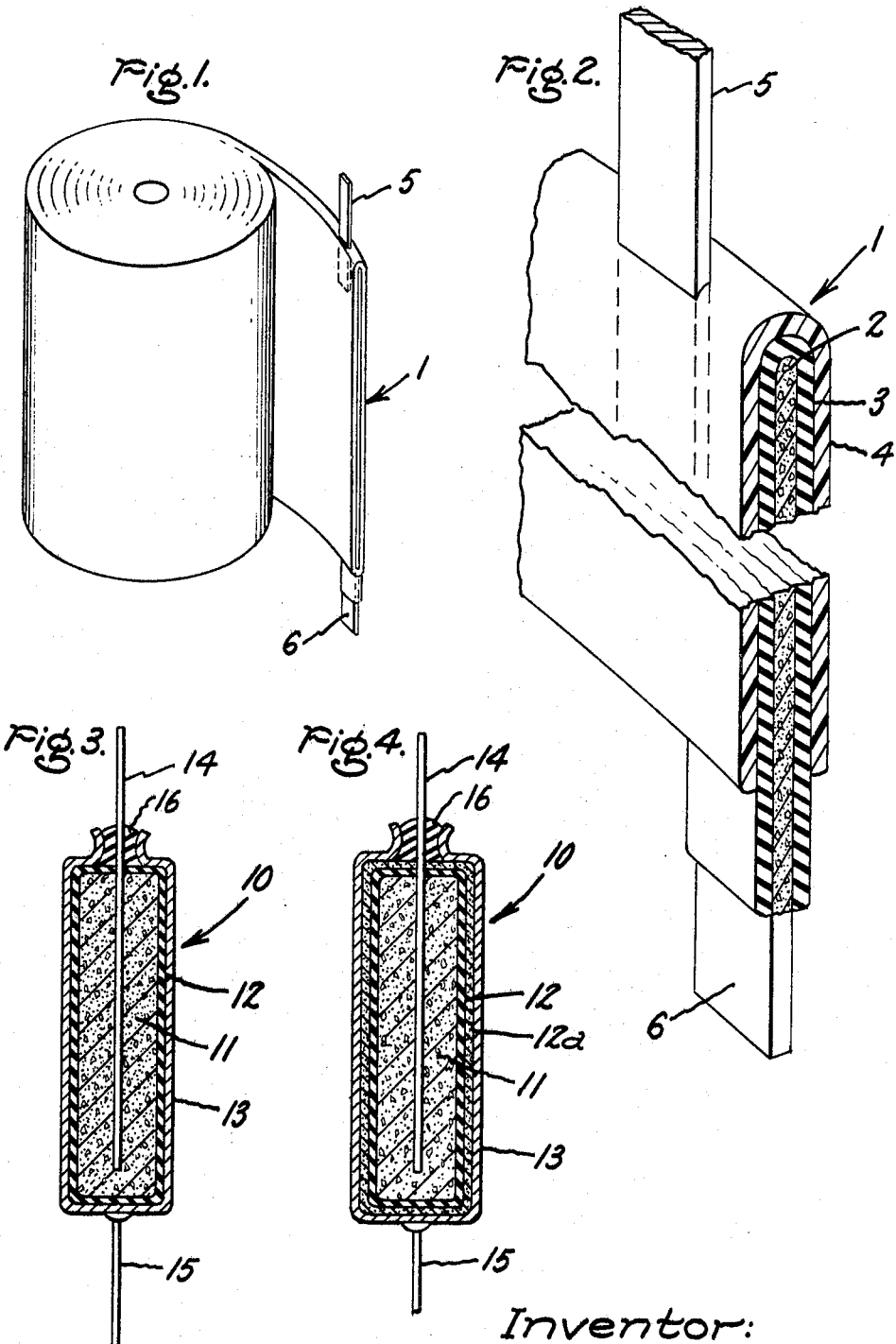

3,483,438
CAPACITOR HAVING ELECTRODE COATED WITH CONDUCTIVE SOLID POLYMER ELECTROLYTE
Amandus H. Sharbaugh, Elnora, N.Y., assignor to General Electric Company, a corporation of New York
Filed Feb. 2, 1968, Ser. No. 702,571
Int. Cl. H01g 9/00
U.S. Cl. 317—230                    10 Claims

ABSTRACT OF THE DISCLOSURE

The capacitor has one electrode having an adherent, non-porous dielectric oxide coating thereon and a second electrode comprising a coating on said oxide coating, of a nitrogen-containing polymer which has dissolved therein, sufficient quantities of a 7,7,8,8-tetracyanoquinodimethan and a salt of 7,7,8,8-tetracyanoquinodimethan to give the polymeric composition a conductivity greater than $10^{-3}$ mho/cm.

---

This invention relates to electrical capacitors, hereinafter for brevity, called capacitors, comprising two electrodes separated by a solid dielectric. More particularly this invention relates to capacitors having one electrode having an adherent, non-porous dielectric oxide coating thereon, and a second electrode comprising a coating on said oxide coating of a nitrogen-containing polymer containing dissolved therein sufficient quantities of a salt of 7,7,8,8-tetracyanoquinodimethan, hereinafter, for brevity called TCNQ salt or salt of TCNQ, and free or uncombined 7,7,8,8-tetracyanoquinodimethan, hereinafter, for brevity called TCNQ to give the polymeric composition a conductivity greater than $10^{-3}$ mho/cm. Such a capacitor is free of any fluid and is commonly referred to as a solid capacitor.

Electrical capacitors that are presently known in the art generally can be classified into two main groups, one group comprises those capacitors having one or more pairs of parallel, electrically conductive electrodes, arranged either in the form of a stack or a convolute roll, separated by an electrically insulating or dielectric liquid. The dielectric liquid frequently is used to saturate a paper or other fibrous material of high dielectric strength used as a spacer between the two electrodes. A variation of this type of capacitor has one or more pairs of electrodes, each having a dielectric oxide film thereon, with an electrolyte, for example, an aqueous ammonium pentaborate-ethylene glycol solution filling any void space between the two oxide coatings. In these capacitors, the electrodes may be either in a stacked arrangement like a sheaf of papers or in a convolutely wound roll.

The second general class of capacitors are those in which one electrode is a porous or sintered metal slug, generally cylindrical in shape, with all of the exposed metal surface having an adherent, non-porous dielectric oxide coating thereon on top of which a layer or coating of a solid electrolyte, usually manganese dioxide, is deposited. The mass of sintered metal particles of the slug forms one electrode and the solid electrolyte forms the other electrode with the oxide coating acting as a dielectric separating these two conductors. A variation of this type of capacitor uses a liquid electrolyte, such as aqueous ammonium pentaborate-ethylene glycol in place of the solid electrolyte.

It would be highly desirable to make a capacitor that would be completely free of any fluids and to be able to make them in any of the conventional forms, e.g., in the form of wire, stacked sheet, convolute roll, slug, etc., and of any of the metals previously used, e.g., aluminum, tantalum, niobium, titanium, etc. Although the above-described slug type capacitor with the solid electrolyte does permit the making of one form of capacitor which is free of fluids, it has never been found practical to produce it in any of the other conventional forms.

Furthermore, in forming the manganese dioxide coating, problems arise since the slug must be impregnated with a water-soluble salt of manganese, for example, manganese nitrate, which is then thermally decomposed to manganese dioxide. Because of the temperature required and the corrosiveness of the by-products, aluminum can not be used to form the porous slug. Also in order to insure a complete coating of manganese dioxide on the oxide coating, it is necessary to repeat the impregnation and thermal decomposition steps several times. During thermal decomposition of the manganese salt, the dielectric oxide layer on the metal is attacked so that between each impregnation step, it is necessary to reform the dielectric oxide layer wherever it has been destroyed. Because of these difficulties and multiple processing steps, such capacitors have been very expensive to produce. Furthermore, such capacitors have been limited in use to voltages which are 20 to 30% of the voltage used in forming the dielectric oxide coating, i.e., the so-called formation voltage.

One approach for overcoming the difficulties of making these slug capacitors is disclosed in U.S. Patents 3,214,648 and 3,214,650. These patents disclose the formation of an organic charge-transfer complex in situ on the dielectric oxide film to produce a solid electrolyte. By this means, a conventional slug capacitor having a dielectric oxide coating on the exposed metal surfaces, is impregnated with a solution of one of these complexes. Evaporation of the solvent, leaves a deposit of crystals of charge-transfer complex on the surface of the dielectric oxide coating.

To obtain as complete coverage of the surface of the oxide and as complete filling of the pores as is possible, it is necessary to use saturated solutions of the complex and to repeat the impregnation several times. The final solid electrolyte obtained by this method, is an interlaced, but still porous mass of crystals in the pores of the slug and on the dielectric oxide film.

Since the temperature required for evaporation is relatively low and the charge-transfer complexes are generally non-corrosive, this method overcomes some of the adverse features of the prior method of making a solid electrolyte in a slug capacitor. However, this solid electrolyte as formed in situ has certain disadvantages which it would be desirable to overcome. Since there is only point-to-point contact between the crystals, and since the conductivity of these crystals is dependent on the orientation of the crystal axes, the conductance, i.e., the conductance through the interlaced crystalline mass, is considerably lower than the conductance that would be obtained if it were possible to deposit the crystals as a void free mass. Since there is nothing to adhere the crystals onto the surface of the dielectric oxide layer, other than the roughness of the surface, great care must be exercised in handling the capacitor before encasement to prevent dislodging any of the crystals on the outer surface. This problem is greatly accentuated when it is desired to use such a solid electrolyte on the oxide surface of a sheet or foil of metal which must then be stacked or convolutely wound to form the capacitor before encasement.

It is an object of my invention to provide a solid, i.e., fluid-free, capacitor that is not subject to the shortcomings of the solid capacitors of the prior art.

It is another object of this invention to provide a solid capacitor having no injury to the dielectric oxide film of the capacitor so that it may be used at voltages more closely approaching the formation voltage used in producing the dielectric oxide coating.

It is still a further object of this invention to provide a solid capacitor which can be made in any of the various conventional forms, i.e., roll, slug, stack, wire, etc.

It is still another object of my invention to provide an improved capacitor which has a coherent continuous, mechanically strong, solid electrolyte as an electrode on the exposed surface of the dielectric oxide film formed on the other electrode of a capacitor.

These and other objects and advantages of this invention will become apparent from the following description and the appended claims.

With the above objects in view, the present invention relates to an electrical capacitor comprising, in combination, an electrode formed of an anodizable metal, sometimes referred to in the art as a film-forming metal, an adherent, dense (i.e., non-porous) dielectric oxide film formed thereon, and a second electrode, sometimes referred to as the counter electrode comprising a coating on top of said oxide coating of a nitrogen-containing polymer which contains dissolved therein, sufficient quantities of a salt of TCNQ and free TCNQ to give the polymeric composition a conductivity greater than $10^{-3}$ mho/cm.

The invention will be better understood from the following description taken in conjunction with the accompanying drawing in which:

FIGURE 1 shows partially unrolled capacitor section of one type which embodies the present invention wherein the edge of the foil has been exposed for illustration.

FIGURE 2 shows an enlarged cross-section of the exposed edge of the foil used in the capacitor of FIGURE 1.

FIGURES 3 and 4 show another form of capacitor embodying the invention.

Referring now to the drawing, and particularly to FIGURE 1, there is shown a capacitor of the usual rolled foil type, except that it contains only a single convolutely wound, coated metal foil 1, rather than the usual two metal foils separated from each other by a dielectric. The construction of this coated foil 1 is shown in greater detail in the enlarged cross-sectional view in FIGURE 2, where an anodizable metal foil 2, has an adherent, non-porous dielectric oxide film 3, on its surface said oxide film being covered on its outer surface with a solid electrolyte 4 comprising an electrically conductive nitrogen-containing polymer coating described in more detail hereinafter. Electrical lead 6 is in direct electrical contact with the foil 2 and may be an extension thereof, or a separate piece of metal rigidly attached, as for example, by welding or by mechanical means if desired. As illustrated, the oxide coating 3 extends slightly onto lead 6, to insulate the latter from conductive coating 4. Electrical lead 5, makes direct electrical contact and is preferably embedded in the electrically conductive polymer coating 4. There may be one or more leads 5 and 6 suitably spaced along the length of the foil.

If the conventional metal can or sleeve, not shown, is used to encase this capacitor, the casing will be in contact with conductive coating 1. To improve electrical contact to the casing, the entire surface of the conductive coating 1 or a portion thereof, e.g., the top surface can be coated with a conductive layer of metal applied by any method conventional in the art, for example, using a conductive silver paint, sprayed or plated metal, etc., or lead 5, can be a continuous strip of metal of desired length embedded along the top edge of the foil rather than a tab as shown in the drawing. Another alternative would be to have a piece of metal of suitable electrical conductivity which is the size and shape of the top of the roll which is then fastened to the top of the roll, using the same composition used to form the conductive layer 4.

When the casing is a metal can, the capacitor is inserted so that lead or leads 5 and preferably, also the adjacent top surface of the roll will make good electrical contact with the bottom of the can and the cylindrical surface of the roll, preferably will make good electrical contact with the walls of the can. Lead or leads 6 are brought out through the top of the can and insulated from the can by a suitable insulating, sealing member. Such an assembly is similar to that shown and described later with regards to FIGURES 3 and 4.

When the casing is a tube, the tube can be either a conductor, e.g., metal, or an insulator, e.g., plastic. In this case, leads 5 and 6 are brought out at the opposite ends of the tube through a suitable insulating sealing member. An alternative, when the sleeve is conductive, is that a conductive sealing member, for example, metal, a conductive plastic, etc., can be used to close the end through which lead 5 is fastened.

The metal foil 2, may be either plain metal foil of an anodizable metal, i.e., capable of having an adherent, non-porous oxide coating formed thereon by anodizing, for example, aluminum, titanium, tantalum, niobium or other suitable anodizable metal known in the art or it may be these same metals etched to any degree desirable to increase the surface area of the metal foil as is also well known in the art before anodizing. The dielectric oxide film 3, is formed on the plain or etched foil 2, by any anodizing treatment well known in the art to produce an adherent, non-porous oxide coating over the entire surface of the foil except for that portion of lead 6 required for making an electrical connection. Even the latter portion may be anodically coated with oxide, if desired and later removed, for example by abrasion, etc., at the time of making the connection.

Thereafter, electrical terminal 6 is masked, if desired, by suitable means and the electrically conductive coating 4 applied by any suitable means, for example, spraying with, or dipping in a solution of the electrically conductive nitrogen-containing polymer which is described in more detail hereinafter. During this process, lead 5 of a suitably conductive metal, preferably is embedded in coating 4. Alternatively, lead 5 may be merely placed in intimate contact with the surface of coating 4, for example, during rolling up of capacitor, however, such technique does not permit as good electrical contact as when the lead 5 is embedded in coating 4.

FIGURES 3 and 4, both show an assembled slug type capacitor 10 sometimes referred to as a pellet capacitor which comprises a porous metal slug 11, generally formed of particles of an anodizable metal, sintered into a coherent porous mass. These particles of metal may be the same as the metal used for the foil of the capacitor shown in FIGURE 1. This porous metal slug is anodized in the same way as described above for FIGURES 1 and 2 to produce an adherent non-porous film of dielectric oxide over all of the exposed surface of the metal in the slug, both on the outer surface and within the pores. In making this slug, a wire lead 14 is disposed therein, usually at the axis. This lead likewise is made out of an anodizable metal so that the oxide coating is formed on lead 14 at least on its surface which is in contact with the conductive coatings 12 and 12A, and generally that portion which extends into insulating sealing member 16. If the entire length of lead 14 has been coated with the oxide coating, it may be removed on the terminal portion where electrical contact is to be made.

This slug, with its dielectric oxide coating is impregnated with a solution of the electrically conductive polymer 12 which penetrates into the interstices of the slug and also coats the exterior of the slug as shown. This coating of conductive polymer 12 may, if desired as illustrated in FIGURE 4 be coated with a coating 12A, of conductive graphite, sprayed or plated metal, conductive silver paint, etc., generally called a contact electrode, to provide improved electrical contact with metal casing 13, which has a lead 15 firmly attached thereto. Should it be desirable to make casing 13 out of a non-conductor, this is generally done by using a tube instead of a can and having lead 11 make a direct electrical contact with conductive coating 12 and/or 12A and sealing this end in the same or similar manner as described for lead 14. This construction can also be used for a metal or other conductive sleeve.

After formation of the capacitor with its dielectric oxide coating and conductive polymeric coating, it is inserted in can 13 and the end closed by any suitable insulating sealing material, for example, a resilient plastic, rubber, potting compound, etc. One means is illustrated in the drawing where metal can 13 has been crimped over onto an insulating sealing member 16, made of suitable resilient material.

Other embodiments of capacitors which may be constructed according to this invention which will be readily understood by those skilled in the art included a stack of metal plates of any desired configuration each bearing the dielectric oxide coating and conductive coatings shown in FIGURE 2. Another form of capacitor, is the wire capacitor in which the wire is anodized along at least a portion of its length to form the metallic oxide which is covered with the conductive coating, incorporating the same general structure again as illustrated in FIGURE 2, except that the metal electrode will be a wire rather than foil.

From the above description, it is evident that the conductive nitrogen-containing polymer coating 1 of FIGURES 1 and 2 and 12 of FIGURES 3 and 4, must have a suitable electrical conductivity for the capacitor to function properly. I have determined that these conductive polymers should have a conductivity of at least $10^{-3}$ mho/cm. As a general class, polymers are insulating materials, i.e., have little if any electrical conductivity. Many proposals have been made in the past for making polymers electrical conductive. Generally, this has involved incorporating metal powders or other electrically conductive solids, such as, carbon blacks into the polymer. Although these compositions do have some electrical conductivity, such conductivity is not sufficient to permit them to be used in such an application as proposed herein.

Lupinski et al. in the copending application, Ser. No. 561,487, filed Mar. 29, 1965, now Patent 3,424,698, and assigned to the same assignee as the present invention, disclose novel compositions comprising a nitrogen-containing polymer containing dissolved therein, a salt of TCNQ and free TCNQ which has a surprisingly high electrical conductivity. Unexpectedly, I have found that these compositions have several properties which make them admirably suitable for use as the solid electrolyte in a solid capacitor. Their use overcomes the difficulties previously mentioned and permits these capacitors to be made in any of the conventional forms, including capacitors in miniature circuits. The disclosure of the above application is hereby incorporated by reference.

The particular nitrogen-containing polymers that are suitable are the polymers of acrylonitrile, polymers of methacrylonitrile, polymers of vinyl pyridines, polymeric urethanes, which includes copolymers of these compounds with each other as well as with other polymerizable monomers which do not need to be nitrogen-containing. These polymers have the unique property of dissolving TCNQ and salts of TCNQ. Since for the use as a solid electrolyte, these polymers are used as a surface coating the molecular weight should be sufficiently high that the polymers have film forming properties.

When the amount of TCNQ salt is at least 1% and the amount of free TCNQ is at least 0.5% by weight of the total polymer composition, the conductivity suddenly increases to produce compositions having a conductivity greater than $10^{-10}$ mho/cm. Increasing the amount of TCNQ and/or TCNQ salt increases the conductivity still further to permit conductivities of around 2 mho/cm. to be obtained. Still higher conductivities are obtained by increasing the concentration of the TCNQ and TCNQ salt to form a two phase system in the polymer, one phase comprising the polymer containing the dissolved TCNQ and TCNQ salt and the other phase comprising dispersed crystals of TCNQ and/or TCNQ salt, but preferably crystals of both are present.

TCNQ and its various salts and methods of preparation are described in J. Am. Chem. Soc., 84, 3370—(1962), which is hereby incorporated by reference. The TCNQ salts may be any of the various known simple salts of TCNQ represented by the simple salt formula

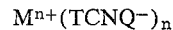

$$M^{n+}(TCNQ^-)_n$$

in which M may be metallic or organic cation, and $n$ is the valence of the cation, or they may be a complex salt as represented by the formula $M^{n+}(TCNQ^-)_n \cdot (TCNQ)$, which contain a molecule of neutral TCNQ in addition to the TCNQ ion. In this formula, M and $n$ are as previously described.

When the simple salts are used, additional free TCNQ must be added to produce the desired conductivity in the polymeric composition. Since complex salts already contain free TCNQ, no additional TCNQ need be added when the complex salts are used to add to the polymeric composition. M can be a wide variety of metal ions, for example, iron, copper, manganese, barium, lithium, sodium, potassium, rubidium, cesium, cobalt, lead, nickel, chromium, etc., or it may be an organic cation, for example, various amines, ammonia, alkyl ammonia cations, etc. These various TCNQ salts are fully described and their method of preparation given in the above referenced J. Am. Chem. Soc. article.

The polymers of vinyl pyridines (e.g., 2-, 3-, 4-, vinyl pyridine, etc.), acrylonitrile and methacrylonitrile are well known. These can be either homopolymers or copolymers in which the vinyl pyridine, acrylonitrile or methacrylonitrile or a mixture thereof are copolymerized with other polymerizable monomers. The polymers of vinyl pyridines may have from 1 to 2 lower alkyl substituents on the pyridine ring, in addition to the vinyl group, e.g., polymers of methyl vinyl pyridine, dimethyl vinyl pyridine, ethyl vinyl pyridine, methyl ethyl vinyl pyridine, etc. However, since the ability to dissolve the TCNQ salts and TCNQ is apparently dependent upon the polymer having groups containing nitrogen, it is generally preferable to use those polymers in which the vinyl pyridine, acrylonitrile or methacrylonitrile or mixtures thereof are the preponderant ingredients, i.e., greater than 50% of the polymer molecule is a vinyl pyridine, acrylonitrile, methacrylonitrile or a mixture thereof. However, this is not a requirement since the elastomeric butadiene-acrylonitrile copolymers which have less than 50% acrylonitrile, e.g., 15–35% acrylonitrile, are still capable of being rendered electrically conductive by the incorporation of the TCNQ salt and free TCNQ.

Polymeric urethanes are likewise well known. As a general class, they are made by the reaction of a dihydric alcohol with a diisocyanate. Generally, the dihydric alcohol is in the form of a polyether or a polyester having terminal hydroxyl groups which is chain-extended with the diisocyanate; the isocyanate group reacting with the hydroxyl group to give a carbamic ester group, commonly referred to as a urethane group. They should not be rendered insoluble by incorporation of the cross-linking or curing agent prior to making the coating on the oxide layer. Detailed description of polyurethanes is found in the book "Polyurethanes," by B. A. Dombrow, Reinhold Publishing Corp., New York (1957).

The TCNQ salt and the TCNQ may be incorporated into the above polymers by any suitable means. However, since for my application a coating is to be formed on the dielectric oxide of the capacitor, a solution is required. The easiest means, therefore, is to dissolve the polymer, the TCNQ salt and the TCNQ in a mutual solvent to form a homogeneous solution or to separately dissolve these materials and blend the solution to form a homogeneous solution of the three components. Solvents such as dimethylformamide, dimethylacetamide, α-cyanoacetamide, dimethylcyanamide, etc., or mixtures thereof can be used. These solutions can be used to spray, dip, or otherwise coat a film over the dielectric oxide coating.

On evaporation of the solvent, the polymer film so formed still contains the TCNQ and TCNQ salt dissolved in the solid polymeric film, up to the concentration each of these two components exceeds its solubility limit in the polymer. If the amounts of TCNQ and TCNQ salt exceeds this amount, the excess separates as a dispersed crystalline phase in the polymer which remains saturated with these two components.

The conductivity of the resulting composition increases as the concentrations of the TCNQ salt and TCNQ increase. Generally, concentrations as great as 15–20% of combined weight of the TCNQ salt and TCNQ may be attained before there is any evidence of crystals of these two materials appearing in the polymer matrix. However, the conductivity of those compositions containing crystals of the TCNQ salt or TCNQ is not adversely affected. In fact, the conductivity continues to increase as a function of concentration.

On the other hand, the dissolved phase of TCNQ salt and TCNQ in the polymer phase is a prerequisite. If only the insoluble crystalline phase is present, the conductivity of the polymer is greatly decreased. Insofar as can be determined, polymers of acrylonitrile, polymers of vinyl pyridines, polymers of methacrylonitrile, and polymeric urethanes are the only polymers capable of retaining TCNQ salts and TCNQ as a dissolved phase in the absence of a mutual solvent, i.e., in the solid state.

Solutions of closely related nitrogen-containing polymers for example, polyamides, can be made containing dissolved TCNQ salts and TCNQ. However, on evaporation of the solvent, the TCNQ salts and TCNQ crystallize out as a separate phase in the polymer matrix leaving none in the dissolved phase. As a consequence, the polymers have a very low conductivity.

The amount of TCNQ salt and TCNQ to be incorporated in the polymer matrix is dependent on the conductivity desired and the particularly TCNQ salt used. As Example 1 illustrates, the amount of TCNQ salt and TCNQ that is needed to give a particular conductivity in the polymer is readily determined by incorporating varying amounts of these two components in the polymer and measuring the conductivity. A graphical plot of this data then permits determination of the conductivity of polymers containing other concentrations of these materials.

The addition of a TCNQ salt having TCNQ present only as TCNQ anions is not sufficient. Either a complex salt containing neutral TCNQ, i.e., TCNQ in the free or non-ionic form, in addition to the TCNQ anion incorporated in the salt, or TCNQ plus a simple TCNQ salt, i.e., TCNQ added to a salt containing TCNQ only in the form of TCNQ anions must be used. In other words, both the presence of TCNQ and TCNQ anions are essential to the making of the conductive polymers.

In order that those skilled in the art may better understand my invention the following examples are given by way of illustration and not by way of limitation. In all the examples parts and percentages are by weight unless otherwise stated.

EXAMPLE 1

This example illustrates how the electrical conductivity varies with the concentration of the TCNQ salt and the free TCNQ. In this example, the complex quinoline salt of TCNQ has one quinoline cation associated with one TCNQ anion and one molecule of TCNQ. Since this complex salt contains free TCNQ as part of the complex molecule, it is not necessary to add additional TCNQ in forming the conductive composition.

This quinoline TCNQ complex salt was added to a stock solution contining 100 g. of polyacrylonitrile per liter of dimethylformamide to give concentrations of 2, 5, 10, 15 and 20% by weight based on the solids content of the solution. Films were cast from these solutions and the conductivity measured. The results are shown in Table I.

TABLE I

| Percent complex quinoline salt of TCNQ: | Conductivity at 27° C. mho/centimeter |
|---|---|
| 2 | $2.0 \times 10^{-3}$ |
| 5 | $2.0 \times 10^{-3}$ |
| 10 | $8.7 \times 10^{-2}$ |
| 15 | 2.0 |
| 20 | 2.7 |

Examination of the X-ray diffraction patterns of these films showed that the film containing 20% of the complex quinoline salt contained microcrystals, indicating that some of the salt had precipitated as a crystalline phase.

In place of the complex quinoline salt of TCNQ, the simple quinoline TCNQ salt plus TCNQ can be used. The corresponding concentrations of the simple quinoline TCNQ salt and TCNQ corresponding to the concentrations shown in Table I of the complex salt are shown in Table II.

TABLE II

| | Corresponding to— | |
|---|---|---|
| | Percent Simple Quinoline Salt of TCNQ | Percent TCNQ |
| Percent Complex Quinoline Salt of TCNQ: | | |
| 2 | 1.24 | 0.76 |
| 5 | 3.10 | 1.90 |
| 10 | 6.20 | 3.80 |
| 15 | 9.30 | 5.70 |
| 20 | 12.40 | 7.60 |

EXAMPLE 2

Examples 2 and 3 are typical of other conductive polymer compositions suitable for making the capacitors of this invention. An approximately 10% solution of a soluble, thermoplastic, polymeric urethane comprising a polyester of 1,4-butanediol and adipic acid chain extended with 4,4'-diphenylmethane diisocyanate, and the complex quinoline salt of TCNQ in the proportion of 8.5 g. of the former to 1.5 g. of the latter was made using dimethylformamide as the solvent. A film cast from this solution, after evaporation of the solvent, had a conductivity at 27° C. of $1 \times 10^{-2}$ mho/centimeter.

EXAMPLE 3

Example 2 was repeated except the polymer was a mixture of polyacrylonitrile and polyvinylpyridine and the proportions were such that the cast film was 46.3% polyacrylonitrile, 15.1% polyvinylpyridine and 38.6% complex quinoline salt of TCNQ. This film had a conductivity at 27° C. of $1.2 \times 10^{-1}$ mho/centimeter. In place of the mixed polymer a copolymer of acrylonitrile and polyvinylpyridine can be used.

EXAMPLE 4

The following is an illustration of the use of the subject conductive polymers in a foil type electrical capacitor as illustrated in FIGURES 1 and 2. A metal foil 1 of anodizable metal, for example, aluminum or tantalum, etc., is electrolytically oxidized to form an adherent, nonporous oxide coating 2 over the entire surface of the foil. This oxidized coating is then coated by spraying, dipping or other suitable means with a conductive polymer solution such as those of Examples 1–3 and the solvent allowed to evaporate forming an adherent coating of the conductive polymer on the surface of the oxide. This metal foil can be either in the form of sheets and stacked into a parallel-plate type capacitor or in the form of a continuous sheet which is rolled to form a capacitor as illustrated in FIGURE 1. In forming the coating 4 of the electrically conductive polymer, one or more leads 5 are embedded in the coating prior to the evaporation of the solvent. Both the oxide and polymer coating are removed from terminal 6 as illustrated in the drawings. By this means, leads 5 and 6 are provided of opposite polarity. Other suitable means will be readily apparent to those skilled in the art for providing these terminals. Capacitors made by this general procedure will have capacitances which are dependent on the metal and the surface finish of the metal foil 1. Table III lists the capacitance values in microfarads per square inch of capacitors of different metals having different surface finishes. The conductive polymer composition used in coating the solid electrolyte as the second electrode on the metal oxide dielectric on the surface of the metal was formed by spraying a solution containing 1.5 g. of the quinoline complex salt of TCNQ, 50 ml. of pyridine, 50 ml. of dimethylformamide, 250 ml. of acetone and 15 ml. of a solution of 10 g. of the polyurethane of Example 2 in 100 ml. of pyridine. Since the salts of TCNQ are highly colored, it is very easy to detect the conductive polymeric coating and to insure complete coverage over the desired areas so that they will be free of any pinholes or other defects.

TABLE III

| Metal foil: | Capacitance ($\mu$fd./in.$^2$) |
| --- | --- |
| Anodized aluminum | 0.35 |
| Lightly etched, anodized aluminum | 1.3 |
| Heavily etched, anodized aluminum | 3.4 |
| Anodized tantalum | 0.69 |
| Lightly etched, anodized tantalum | 0.89 |

Another capacitor was made from anodized tantalum foil having a coating of conductive polymer on the oxide coating deposited by spraying a solution containing 40 mg. of polyacrylonitrile and 36 mg. of the quinoline complex salt of TCNQ per ml. of solution using dimethylformamide as the solvent. This capacitor had a capacitance of 0.7 $\mu$f. and a dissipation factor of 2.28% measured at 120 c.p.s. with a 1.5 v. DC bias and a 0.1 v. AC signal. A DC voltage was applied in 1 volt steps up to 25 volts. After 100 hours at 25 volts the leakage current was less than 1 $\mu$a. This capacitor was found to be safely operable at voltages up to 75% of the formation voltage used in anodizing the tantalum foil without failure, e.g., using a formation of 100 v. DC to form the dielectric oxide coating on the tantalum, the capacitor was found to be safely operable at voltages up to 75 v. DC. Actual breakdown of the dielectric oxide coating did not occur until 94 v. DC.

EXAMPLE 5

The following is an illustration of the use of the conductive polymers in forming a capacitor having a porous metal slug 11 as illustrated in FIGURES 3 and 4. This porous electrode is formed of coherent sintered anodizable metal particles in a manner conventional in the art. An adherent, non-porous dielectric oxide film, not shown, is formed on all of the exposed metal surfaces including those in the pores or interstices by suitable anodization techniques well known in the art. A solution of a conductive polymer such as that previously described is then applied by dipping or immersing the electrode in a solution containing the nitrogen-containing polymer, the salt of TCNQ and free TCNQ preferably, by use of vacuum technique to attain complete impregnation of the porous electrode with the conductive polymer solution and to effect complete coverage of the oxide coating with a coating 12 of the conductive polymer. Evaporation of the solvent is carried out so as not to cause any bubbles to form in the conductive polymer film. Repeated coatings effectively fill all of the pores of the porous electrode and coat the external surface of the slug. As illustrated in FIGURE 4, prior to assembling the capacitor into its container, the conductive polymer coating itself, can be coated with an electrically conductive film of conductive carbon, conductive metal paint or if desired, a metal coating formed by electro-deposition since the polymer is sufficiently conductive to permit electroplating of the metal on its surface. The capacitor is then assembled into a container by conventional means.

EXAMPLE 6

The advantages of using a conductive polymer containing a dissolved salt of TCNQ and free TCNQ over using only TCNQ and a salt of TCNQ to form a crystalline conductive coating is illustrated by the following example.

A saturated solution of the complex quinoline salt of TCNQ in dimethylformamide was spread over the surface of an anodized aluminum foil. Evaporation of the solvent resulted in a non-uniform deposition of the complex salt crystals since the crystals formed as more or less isolated islands with a relatively thin deposition of crystals between the island. When a second film of the solution was applied, many of the previously deposited crystals became loose and floated in the solution. Again, evaporation of the solvent lead to the same non-uniform, but thicker deposition of crystals.

To obtain as uniform coating as possible, the saturated solution was diluted with acetone to produce a sprayable solution. This solution was sprayed onto an anodized aluminum electrode using a series of repeated sprayings. Each spraying cycle was continued until a wet but nonflowable film was deposited over the entire area except for a masked area where electrical contact was to be made to the aluminum. Spraying was stopped until the solvent had evaporated from the film and then the spraying and drying cycles repeated until the desired area was covered with a coating of crystals in essentially the same amount per unit area as was present per unit area in the polymer layer of the anodized aluminum foil of Example 4. Microscopic examination of this crystalline coating showed it to be a mass of intertwined crystals completely covering the desired electrode area with some crystals growing up like trees from the intertwined crystalline mass.

A parallel-plate type capacitor made from this crystalline coated anodized aluminum foil was found to have a capacitance of only 0.16 microfarads per square inch compared to 0.35 microfarads per square inch for the same type polymeric coated capacitor of Example 4. Furthermore it was noted that any slight flexing of the electrode caused the intertwined crystalline mass to lift and buckle from the anodized surface showing that it would be impossible to roll such an electrode into a roll-type capacitor without separation of the crystalline coating from the anodized surface. This is in marked contrast to the polymer coated electrode where the polymeric coating was tightly adherent and the coated electrode could be severely flexed or rolled without dislodging of the polymer coating.

From the above description it is seen that by the use of these electrically conductive polymers as solid electrolytes in making the counter electrodes of the solid capacitors, the difficulties of the prior art have been overcome. These polymers permit the making of the counter electrode as a solid continuous coating on all of the various forms of capacitors, either as a surface coating or as an impregnant. The coating is tenaciously adherent to the dielectric oxide substrate and has excellent mechanical, as well as electrical properties.

The mechanical properties permit the coated anodized metal in precut plate form to be readily stacked or in continuous sheet form to be readily rolled into the desired capacitor shape without dislodging or damaging the electrically conductive polymer coating which would seriously affect the electrical properties. Since the polymer forms a continuous coating, there is no tortuous electrical path with the consequent decrease in conductivity as there would be with an interlaced porous mass of crystals of the TCNQ and TCNQ salt. Even when the amount of dissolved TCNQ and TCNQ salt in the solution is so high that crystals of these compounds do form in the solid polymer coating, the crystals are electrically connected to each other over their entire surface by the polymer matrix which surrounds them which itself is conductive. These capacitors can be operated at voltages closely approaching the formation voltage used in forming the dielectric oxide coating.

Since the solvents are readily removed from the coating after it is applied by evaporation even at room temperature or, if desired, by gentle heating at temperatures generally not exceeding 100° C., there is no damage to the dielectric oxide coating substrate. The intense color imparted to the coating by the presence of the TCNQ anion in the polymer coating, greatly aids in assuring complete and uniform coverage of the dielectric oxide substrate as well as identifying those units which have been prepared by this method. This can be of great aid during manufacture of the capacitors to permit detection of any units which for some unexplained reason had bypassed the coating step and were ready to be assembled into a completed capacitor unit.

While the present invention has been described with reference to particular embodiments thereof, it will be understood that numerous modifications may be made by those skilled in the art without departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising, in combination, an electrode having a dielectric oxide coating thereon and a second electrode comprising a coating on said oxide coating of a nitrogen-containing polymer selected from the group consisting of polymeric urethanes, polymers of vinyl pyridines, polymers of acrylonitrile, and polymers of methacrylonitrile, said polymer containing dissolved therein, sufficient quantities of (1) a salt of 7,7,8,8-tetracyanoquinodimethan and (2) 7,7,8,8-tetracyanoquinodimethan to give the polymeric composition a conductivity greater than $10^{-3}$ mho per cm.

2. The electrical capacitor of claim 1 wherein the polymer is a polymer of acrylonitrile.

3. The electrical capacitor of claim 1 wherein the polymer is a polymer of methacrylonitrile.

4. The electrical capacitor of claim 1 wherein the polymer is a polymeric urethane.

5. The electrical capacitor of claim 1 wherein the polymer is a polymer of a vinyl pyridine.

6. The electrical capacitor of claim 1 wherein the polymer contains the complex quinoline salt of 7,7,8,8-tetracyanoquinodimethan.

7. The electrical capacitor of claim 1 wherein the polymer is a polymeric urethane containing the complex quinoline salt of 7,7,8,8-tetracyanoquinodimethan.

8. The electrical capacitor of claim 1 wherein the polymer is a polymer of acrylonitrile containing the complex quinoline salt of 7,7,8,8-tetracyanoquinodimethan.

9. The electrical capacitor of claim 1 wherein the polymer is a polymer of a vinylpyridine containing the complex quinoline salt of 7,7,8,8-tetracyanoquinodimethan.

10. The electrical capacitor of claim 1 wherein the polymer coating is a two phase system comprising a polymer phase saturated with (a) the salt of 7,7,8,8-tetracyanoquinodimethan and (b) 7,7,8,8-tetracyanoquinodimethan and a second phase of crystals of (a) and (b) dispersed in said polymer phase.

References Cited

UNITED STATES PATENTS

| | | | |
|---|---|---|---|
| 2,145,710 | 1/1939 | Clark | 317—230 |
| 2,786,088 | 3/1957 | Robinson | 317—230 |
| 3,066,247 | 11/1962 | Robinson | 317—230 |
| 3,067,367 | 12/1962 | Ross | 317—230 |
| 3,214,648 | 10/1965 | Ross et al. | 317—230 |
| 3,214,650 | 10/1965 | Ross et al. | 317—230 |

JAMES D. KALLAM, Primary Examiner

U.S. Cl. X.R.

29—570; 252—62.2